United States Patent [19]

Lee

[11] Patent Number: 5,917,715
[45] Date of Patent: Jun. 29, 1999

[54] FORWARD CONVERTER HAVING AN IMPROVED POWER FACTOR AND SUPPRESSING A HARMONIC NOISE COMPONENT OF AN INPUT CURRENT WAVEFORM

[75] Inventor: Jong-Woon Lee, Kyungki-do, Rep. of Korea

[73] Assignee: Samsung Electronics Co., Ltd., Kyungki-Do, Rep. of Korea

[21] Appl. No.: 08/959,014

[22] Filed: Oct. 28, 1997

[30] Foreign Application Priority Data

Nov. 25, 1996 [KR] Rep. of Korea ....................... 96-57210
Nov. 27, 1996 [KR] Rep. of Korea ....................... 96-58602

[51] Int. Cl.$^6$ ................................................. H02M 3/335
[52] U.S. Cl. ............................................................. 363/21
[58] Field of Search ................................... 363/20, 21, 40

[56] References Cited

U.S. PATENT DOCUMENTS

| | | | |
|---|---|---|---|
| 4,355,353 | 10/1982 | Farrer | 363/21 |
| 4,541,039 | 9/1985 | Sandller | 363/21 |
| 4,561,046 | 12/1985 | Kuster | 363/21 |
| 4,870,554 | 9/1989 | Smith | 363/20 |

*Primary Examiner*—Shawn Riley
*Attorney, Agent, or Firm*—Sughrue, Mion, Zinn, Macpeak & Seas, PLLC

[57] ABSTRACT

A forward converter having an improved power factor and suppressing a harmonic noise component appearing at an input current waveform. The forward converter includes a bridge diode, a first smoothing capacitor, a control circuit, a switching element, a transformer, a waveform shaper, a rectifying element, and a second smoothing capacitor. The bridge diode full-wave rectifies an AC input voltage to generate a first DC voltage. The first smoothing capacitor smooths the first DC voltage to generate a second DC voltage. The control circuit generates a switching control signal in response to an input of the second DC voltage. The switching element, which is connected between the first smoothing capacitor and a ground terminal, switches on or off in response to the switching control signal. The transformer, having a primary winding and a secondary winding, receives the second DC voltage through the primary winding when the switching element is switched on, and induces the second DC voltage to the secondary winding. The waveform shaper, which is connected between the bridge diode and the first smoothing capacitor, causes a current flowing into the first smoothing capacitor to have a sine waveform. The rectifying element, which is connected between the secondary winding of the transformer and a load, rectifies a DC voltage induced to the secondary winding to generate a third DC voltage. The second smoothing capacitor smooths the third DC voltage to supply a stable DC voltage to the load.

11 Claims, 9 Drawing Sheets

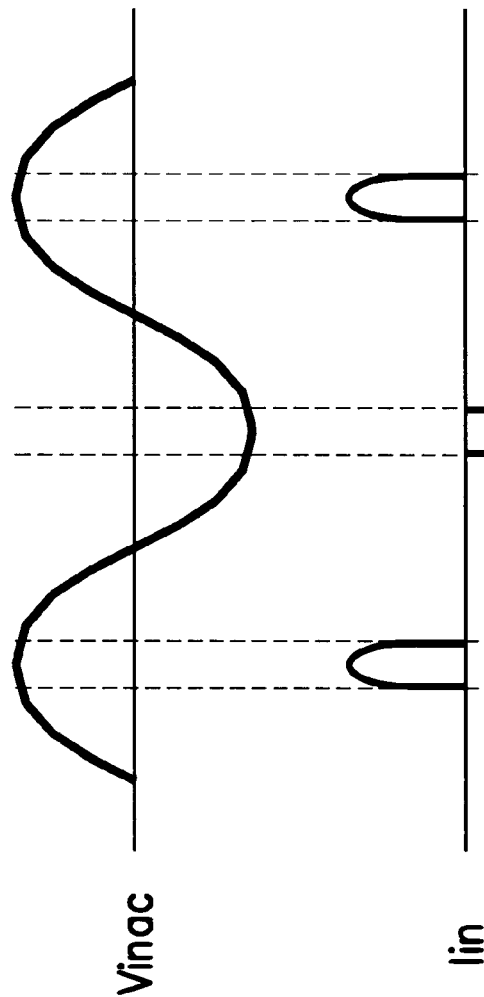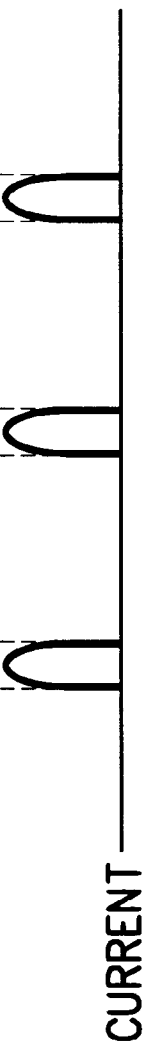
FIG. 2A  Vinac
FIG. 2B  Iin
FIG. 2C  CI VOLTAGE / BD VOLTAGE
FIG. 2D  CI CURRENT

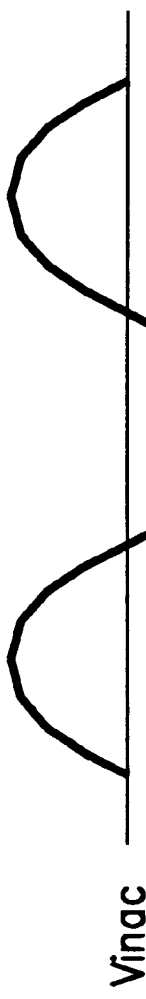
FIG. 3A  Vinac
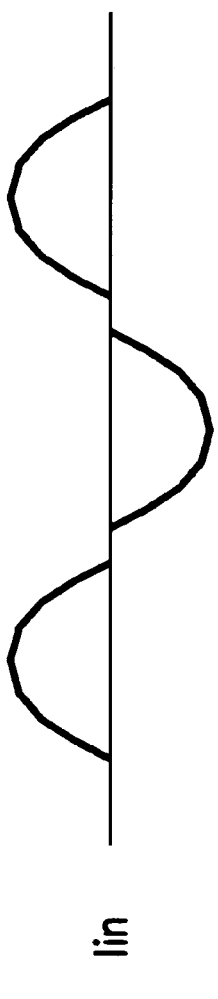
FIG. 3B  Iin
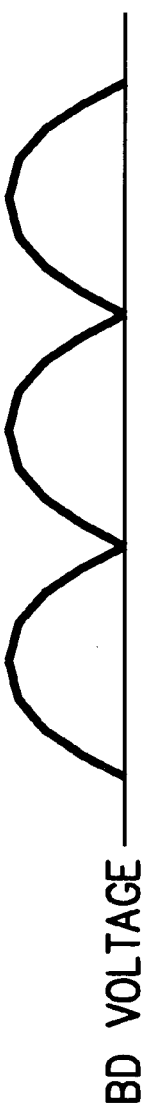
FIG. 3C  BD VOLTAGE
FIG. 3D  CH CURRENT  CI CURRENT

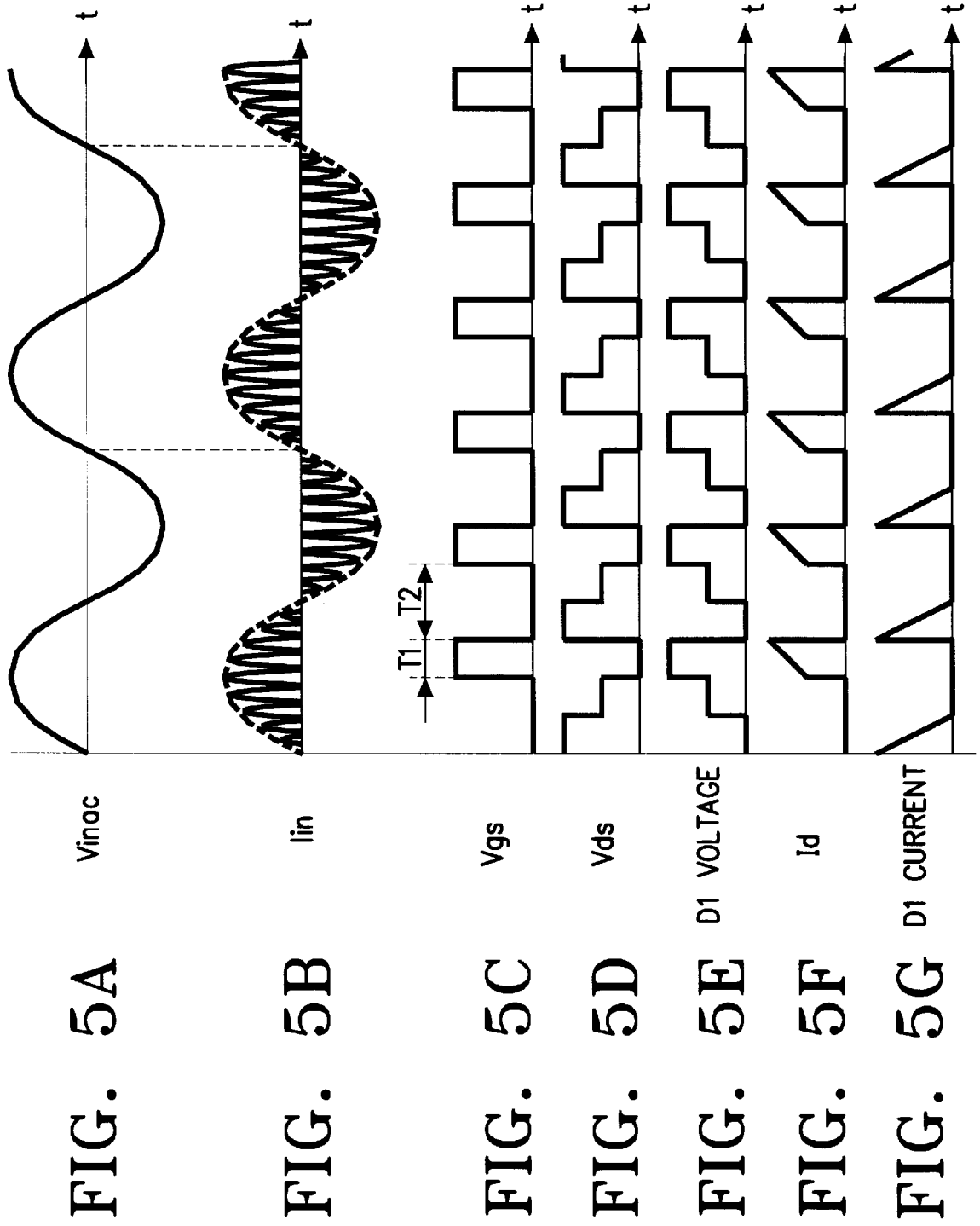

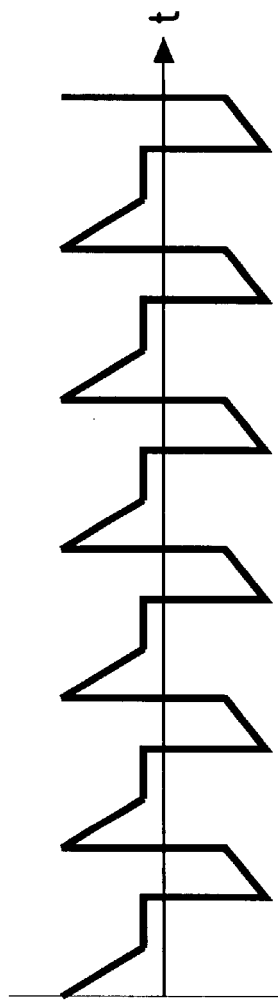
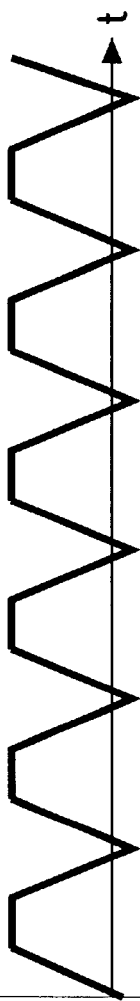
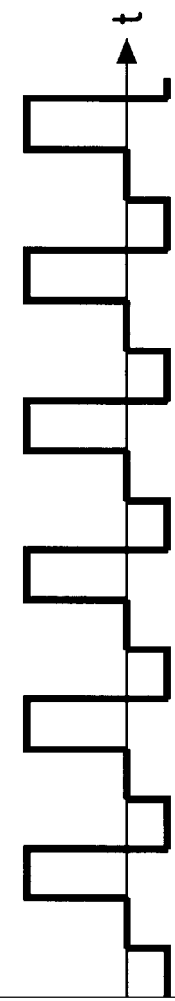
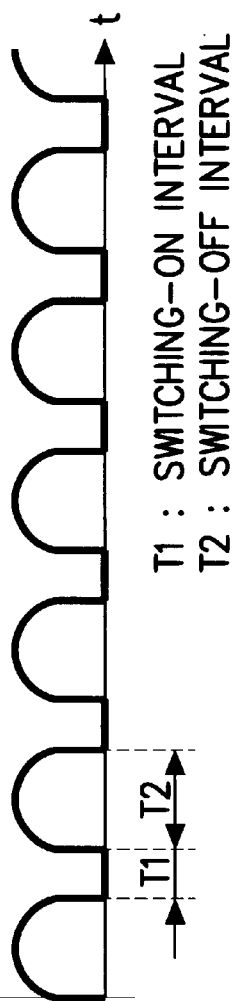
FIG. 5H  CH VOLTAGE
FIG. 5I  CH CURRENT
FIG. 5J  Ls VOLTAGE
FIG. 5K  L1 VOLTAGE
FIG. 5L  L1 CURRENT
T1 : SWITCHING-ON INTERVAL
T2 : SWITCHING-OFF INTERVAL

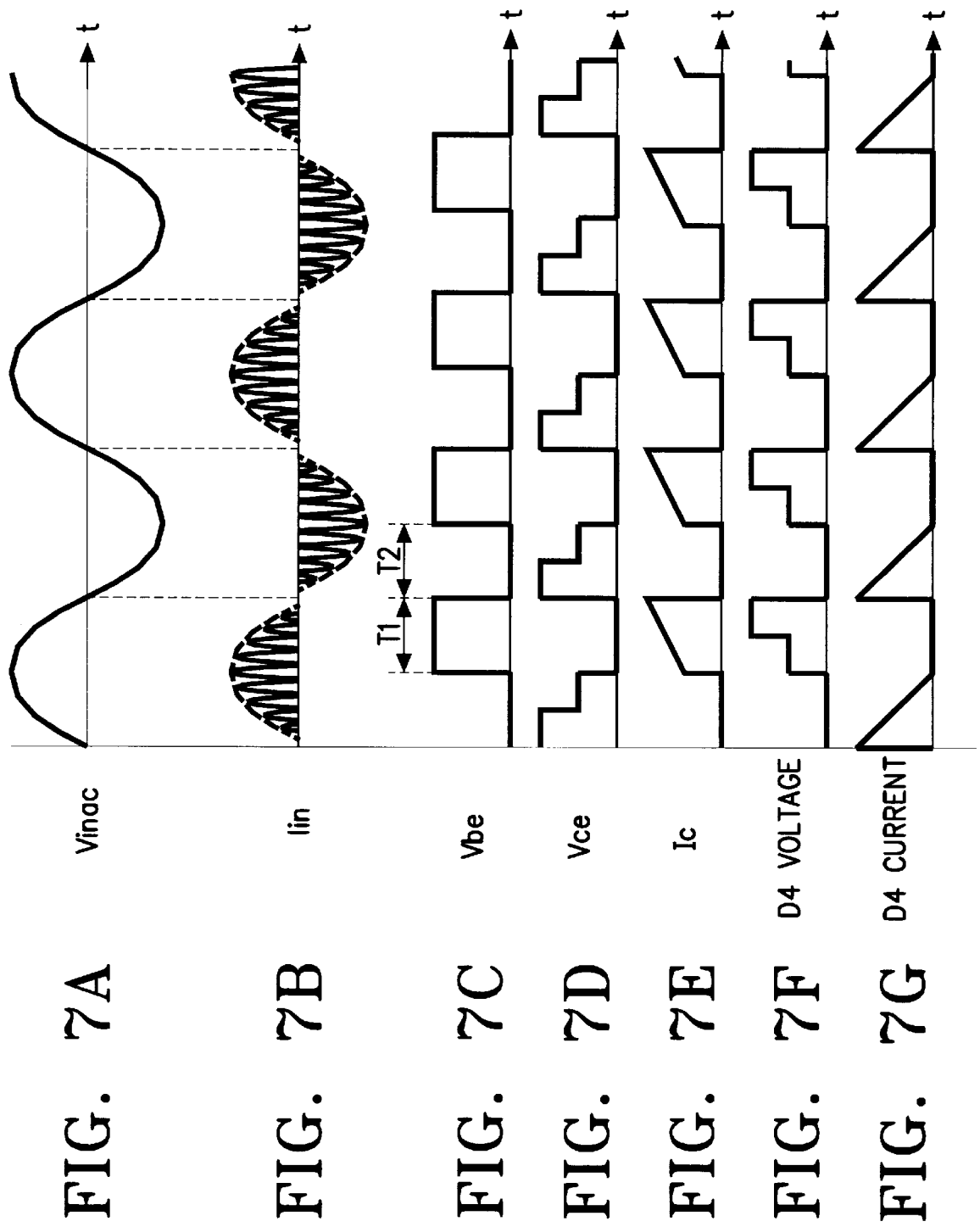

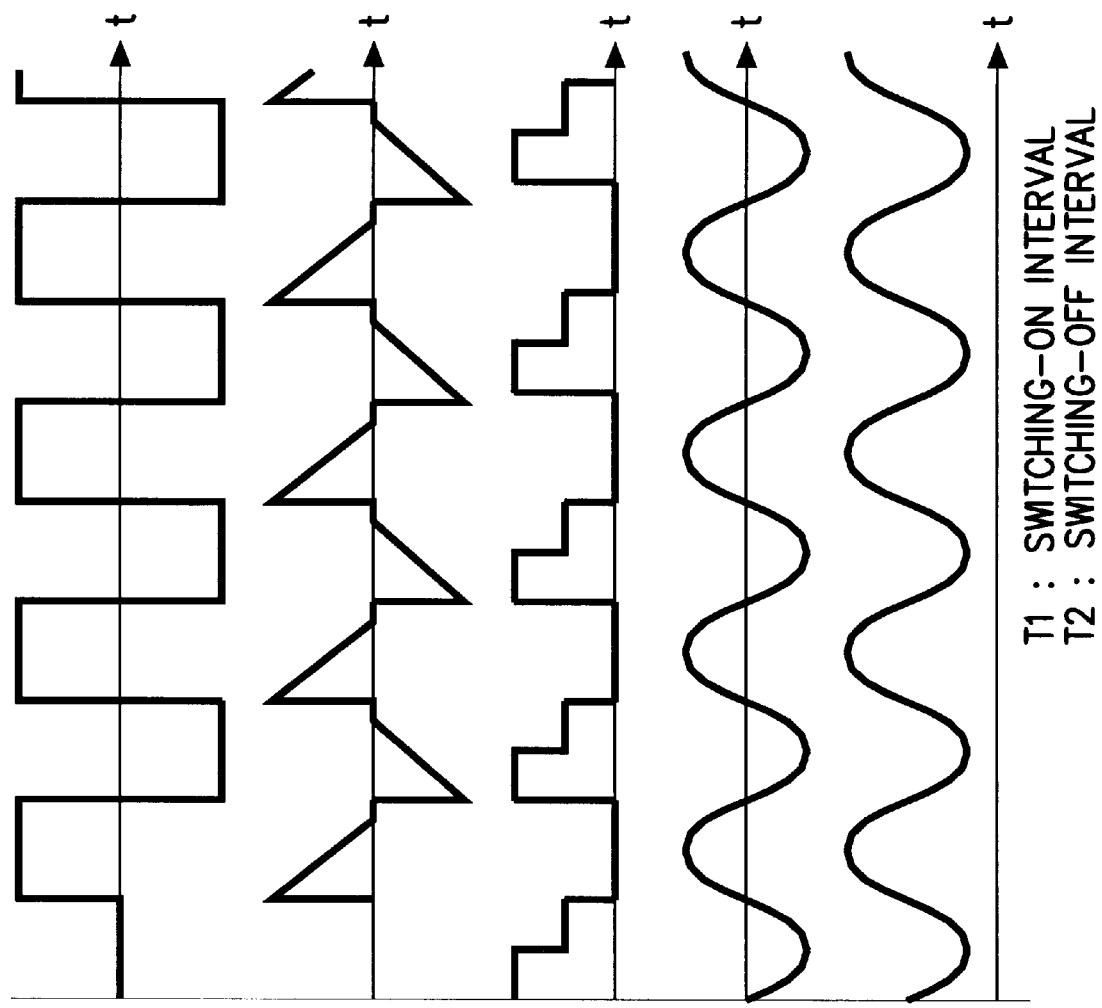

FORWARD CONVERTER HAVING AN IMPROVED POWER FACTOR AND SUPPRESSING A HARMONIC NOISE COMPONENT OF AN INPUT CURRENT WAVEFORM

BACKGROUND OF THE INVENTION

1. Field of the Invention

The present invention relates to a switching mode power supply and, more particularly, to a forward converter for improving a power factor and suppressing a harmonic noise component appearing at an input current waveform. The present invention is based on Korean Application Nos. 57210/1996 and 58602/1996, which are incorporated herein by reference.

2. Description of the Related Art

A switching mode power supply (hereinafter, referred to as the "SMPS") represents power supply equipment for converting an input voltage into a stable voltage according to an operation of a switching mode and supplying the stable voltage to a load. Since the SMPS has a small size, is light in weight and has high efficiency, it meets the demands of the times such as energy saving etc. The SMPS having such features can be utilized as a forward converter and a flyback converter depending on a transformer for transmitting energy to a secondary winding according to the state of a switching element connected to a primary winding.

FIG. 1 illustrates the construction of a conventional forward converter. A bridge diode BD, a capacitor C1, a switching element Q, a diode D1, a control circuit 2, a primary winding Lp of a transformer T1, and a reset winding Lr of the transformer T1 are connected to an input side. A secondary winding Ls of the transformer T1, diodes D2 and D3, a choke coil L1, a capacitor C2 and a load 4 are connected to an output side.

The bridge diode BD full-wave rectifies an AC (Alternating Current) input voltage Vinac. The capacitor C1 smooths the voltage full-wave rectified by the bridge diode BD and supplies the smoothed DC (Direct Current) voltage to the control circuit 2 and the primary winding Lp of the transformer T1. The control circuit 2 generates a switching control signal having a prescribed period in response to an input of the DC voltage smoothed by the smoothing capacitor C1. The switching element Q connected between the primary winding Lp of transformer L1 and a ground terminal is switched on or off in response to the switching control signal generated from the control circuit 2. The transformer T1 includes the primary winding Lp connected between the smoothing capacitor C1 and the switching element Q, the reset winding Lr connected between the smoothing capacitor C1 and the diode D1, and the secondary winding Ls connected to the load 4. If the switching element Q is switched on, the DC voltage smoothed by the smoothing capacitor C1 is accumulated in the primary winding Lp and induced to the secondary winding Ls. If the switching element Q is switched off, energy accumulated in the primary winding Lp is transmitted to the ground terminal through the reset winding Lr and the diode D1. Since the winding Lr and the diode D1 perform such a function, they are called a reset winding and a reset diode, respectively, and prevent the switching element Q from being damaged. The diodes D2 connected between one terminal of the secondary winding Ls of the transformer T1 and the load 4 through choke coil L1, and the diode D3 connected between the other terminal of the secondary winding Ls of the transformer T1 and the load 4 through choke coil L1 are rectifying elements for rectifying the voltage induced to the secondary winding Ls of the transformer T1. The smoothing capacitor C2 connected in parallel to the load 4 smooths the voltage generated through the diode D2 or D3 so that a stable voltage can be supplied to the load 4. The diode D3 is typically called a flywheel diode.

If the AC input voltage Vinac is applied, the bridge diode BD and the smoothing capacitor C1 rectify and smooth the AC input voltage Vinac and generate a corresponding DC voltage. This DC voltage is supplied to the control circuit 2 and the primary winding Lp of the transformer T1. The control circuit 2 is operated according to the DC voltage and generates the switching control signal. The switching element Q is repeatedly switched off and on in response to the switching control signal. The transformer T1 induces the DC voltage supplied to the primary winding Lp to the secondary winding Ls as the switching element Q is switched on or off. The DC voltage induced to the secondary winding Ls of the transformer T1 is rectified by the output diode D2 or the flywheel diode D3 and smoothed by the capacitor C2 via the choke coil L1. The smoothed DC voltage is supplied to the load 4.

As indicated in FIG. 1, the capacitor C1 for smoothing the voltage rectified by the bridge diode BD is connected to the bridge diode BD. Therefore, a charge current flowing into the capacitor C1 approximates to a pulse form as shown in FIG. 2D. That is, a waveform of the voltage (ripple voltage) rectified by the bridge diode BD and a waveform of the voltage smoothed by the capacitor C1 continue to be repeated with a half period between 0 and a maximum value. In this case, the voltage smoothed by the capacitor C1 has a longer high voltage interval than the voltage rectified by the bridge diode BD. During this interval, there is no current flowing into the capacitor C1, and only during a very short interval around the maximum value of the ripple voltage, a current flows into the capacitor C1. Therefore, the current flowing into the capacitor C1 approximates to the pulse form. This form of the current may deteriorate a power factor and generate harmonic noise, thereby leading to a malfunction in the forward converter and increasing a reactive power.

SUMMARY OF THE INVENTION

It is an object of the invention to provide a forward converter having an improved power factor.

It is another object of the invention to provide a forward converter having suppressed harmonic noise.

It is still another object of the invention to provide a forward converter which prevents malfunctions.

It is still yet another object of the invention to provide a forward converter having improved reactive power.

To achieve the above objects of the present invention, there is provided a forward converter in which a phase of an input current approximates to a phase of an input voltage and the input current has a sine waveform.

In accordance with a first aspect of the present invention, a forward converter includes: a bridge diode for full-wave rectifying an AC input voltage to generate a first DC voltage; a first smoothing capacitor for smoothing the first DC voltage to generate a second DC voltage; a control circuit for generating a switching control signal having a prescribed period in response to an input of the second DC voltage; a switching element connected between the first smoothing capacitor and a ground terminal and switched on or off in response to the switching control signal; a transformer having at least a primary winding and a secondary winding, for receiving the second DC voltage through the primary winding when the switching element is switched on and inducing the second DC voltage to the secondary winding; a waveform shaper connected between the bridge diode and the first smoothing capacitor, for causing a current flowing into the first smoothing capacitor to have a sine waveform; a rectifying element connected between the secondary winding of the transformer and a load, for rectifying a DC voltage induced to the secondary winding to generate a third DC voltage; and a second smoothing capacitor for smoothing the third DC voltage to supply a stable DC voltage to the load.

The waveform shaper is a transformer having a primary winding connected between the rectifying element and the load and having a secondary winding connected between the bridge diode and the first smoothing capacitor. Preferably the forward converter further includes a choke coil connected between the waveform shaper and the first smoothing capacitor, for eliminating a harmonic component of a current flowing into the first smoothing capacitor.

In accordance with a second aspect of the present invention, a forward converter includes: a bridge diode for full-wave rectifying an AC input voltage to generate a first DC voltage; a first smoothing capacitor for smoothing the first DC voltage to generate a second DC voltage; a control circuit for generating a switching control signal having a prescribed period in response to an input of the second DC voltage; a switching element connected between the first smoothing capacitor and a ground terminal and switched on or off in response to the switching control signal; a transformer having at least a primary winding and a secondary winding, for receiving the second DC voltage through the primary winding when the switching element is switched on and inducing the second DC voltage to the secondary winding; a voltage provider connected between the bridge diode and the first smoothing capacitor, for providing a reverse voltage to the primary winding of the transformer when the switching element is switched on and providing a forward voltage to the primary winding of the transformer when the switching element is switched off; a rectifying element connected between the secondary winding of the transformer and a load, for rectifying a DC voltage induced to the secondary winding to generate a third DC voltage; and a second smoothing capacitor for smoothing the third DC voltage to supply a stable DC voltage to the load.

The voltage provider is a transformer having a primary winding connected between the rectifying element and the second smoothing capacitor and having a secondary winding connected between the bridge diode and the first smoothing capacitor. Preferably, the forward converter further includes a choke coil connected between the voltage provider and the first smoothing capacitor, for eliminating a harmonic component of a current flowing into the first smoothing capacitor.

In accordance with a third aspect of the present invention, a forward converter includes: a bridge diode for full-wave rectifying an AC input voltage to generate a first DC voltage; a first smoothing capacitor for smoothing the first DC voltage to generate a second DC voltage; a control circuit for generating a switching control signal having a prescribed period in response to an input of the second DC voltage; a switching element connected between the first smoothing capacitor and a ground terminal and switched on or off in response to the switching control signal; a first diode connected between the ground terminal and the first smoothing capacitor; a main transformer having a primary winding connected between the first smoothing capacitor and the switching element, having a reset winding connected between the first smoothing capacitor and the first diode and having a secondary winding connected to a load, for accumulating the second DC voltage in the primary winding so as to be induced to the secondary winding when the switching element is switched on and transmitting energy accumulated in the primary winding to the ground terminal through the reset winding and the first diode when the switching element is switched off; a first rectifying element connected between one side of the secondary winding of the main transformer and the load, for rectifying a voltage induced to the secondary winding of the main transformer; a second rectifying element connected between the other side of the secondary winding of the main transformer and the load, for rectifying a voltage induced to the secondary winding of the main transformer; a second smoothing capacitor connected in parallel to the load, for smoothing a voltage generated through the first or second rectifying element to supply a stable DC voltage to the load; and an auxiliary transformer having a primary winding connected between a reverse terminal of each of the first and second rectifying elements and the second smoothing capacitor and having a secondary winding connected between the bridge diode and the first smoothing capacitor.

A choke coil may be connected between the secondary winding of the auxiliary transformer and the first smoothing capacitor in order to eliminate a harmonic component of a current flowing into the first smoothing capacitor.

In accordance with a fourth aspect of the present invention, a forward converter includes: a bridge diode for full-wave rectifying an AC input voltage to generate a first DC voltage; a first smoothing capacitor for smoothing the first DC voltage to generate a second DC voltage; a control circuit for generating a switching control signal having a prescribed period in response to an input of the second DC voltage; a switching element connected between the first smoothing capacitor and a ground terminal and switched on or off in response to the switching control signal; a first diode connected between the bridge diode and the first smoothing capacitor; a choke coil connected between the first diode and the first smoothing capacitor; a main transformer having a primary winding connected between the first smoothing capacitor and the switching element and having a secondary winding connected to a load, for accumulating the second DC voltage in the primary winding so as to be induced to the secondary winding when the switching element is switched on; a rectifying element connected between the secondary winding of the main transformer and the load, for rectifying a voltage induced to the secondary winding of the main transformer; a second smoothing capacitor connected in parallel to the load, for smoothing a voltage generated through the rectifying element to supply a stable DC voltage to the load; and current control means connected in parallel to the first diode, for increasing a current flowing into the choke coil when the switching element is switched on and providing a reverse current to the choke coil when the switching element is switched off. The current control means includes a resonant circuit having a secondary winding of a transformer installed correspondingly to a primary winding connected between the rectifying element and the secondary smoothing capacitor and having a capacitor, the resonant circuit being connected in parallel to the first diode.

In accordance with a fifth aspect of the present invention, a forward converter includes: a bridge diode for full-wave rectifying an AC input voltage to generate a first DC voltage; a first smoothing capacitor for smoothing the first DC voltage to generate a second DC voltage; a control circuit for generating a switching control signal having a prescribed period in response to an input of the second DC voltage; a switching element connected between the first smoothing capacitor and a ground terminal and switched on or off in response to the switching control signal; a first diode connected between the bridge diode and the first smoothing capacitor; a main transformer having a primary winding connected between the first smoothing capacitor and the switching element and having a secondary winding connected to a load, for accumulating the second DC voltage in the primary winding so as to be induced to the secondary winding when the switching element is switched on; a second diode connected between one side of the secondary winding of the main transformer and the load, for rectifying a voltage induced to the secondary winding of the main transformer; a third diode connected between the other side of the secondary winding of the main transformer and the load, for rectifying a voltage induced to the secondary winding of the main transformer; a second smoothing capacitor connected in parallel to the load, for smoothing a voltage generated through the second or third diode to supply a stable DC voltage to the load; an auxiliary transformer having a primary winding connected between a reverse terminal of each of the second and third diodes and the second smoothing capacitor and having a secondary winding connected in parallel to the first diode; a choke coil connected between the first diode and the first smoothing capacitor; and a third capacitor connected between the secondary winding of the auxiliary transformer and the choke coil.

These and other objects, features and advantages of the invention will become more readily apparent from a review of the detailed description of the preferred embodiments which follow. In the drawings, like reference numerals or symbols designate like elements throughout several views.

BRIEF DESCRIPTION OF THE DRAWINGS

FIGS. 2A to 2D are operational waveform diagrams of the forward converter of FIG. 1;

FIGS. 3A to 3D are waveform diagrams conceptually illustrating an operation of a forward converter according to the present invention;

FIGS. 5A to 5L are operational waveform diagrams of the forward converter of FIG. 4;

FIGS. 7A to 7L are operational waveform diagrams of the forward converter of FIG. 6.

DETAILED DESCRIPTION OF THE PREFERRED EMBODIMENTS

In the following description, well known features or constructions which may obscure the present invention in unnecessary detail are not described in detail.

FIGS. 3A to 3D are waveform diagrams conceptually illustrating an operation of a forward converter according to the present invention. In the conventional forward converter, the current flowing into the smoothing capacitor C1 has the pulse form as shown in FIG. 2D. However, in the forward converter according to the present invention, a phase of an input current approximates to a phase of an input voltage. A waveform of the input current flowing into the smoothing capacitor C1 has a sine waveform as indicated in FIG. 3D.

Figure 1:
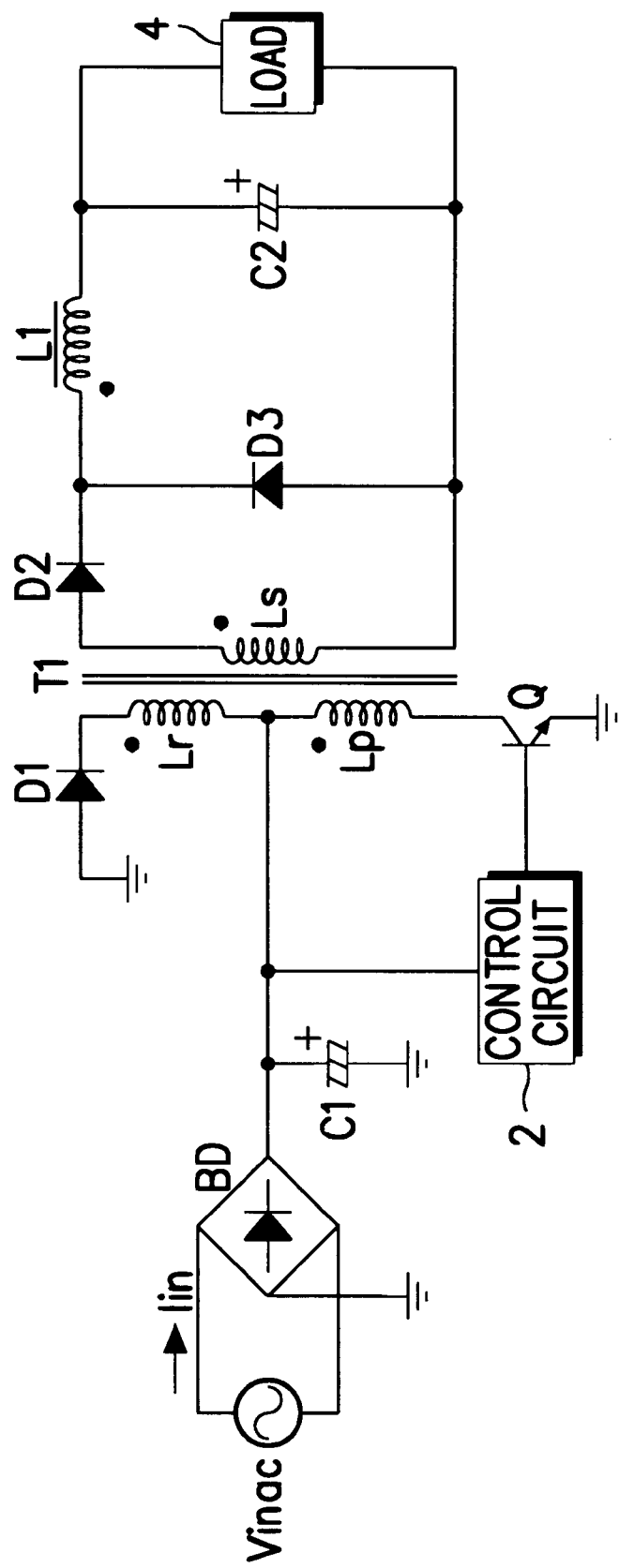
FIG. 1 illustrates the construction of a conventional forward converter.
Figure 4:
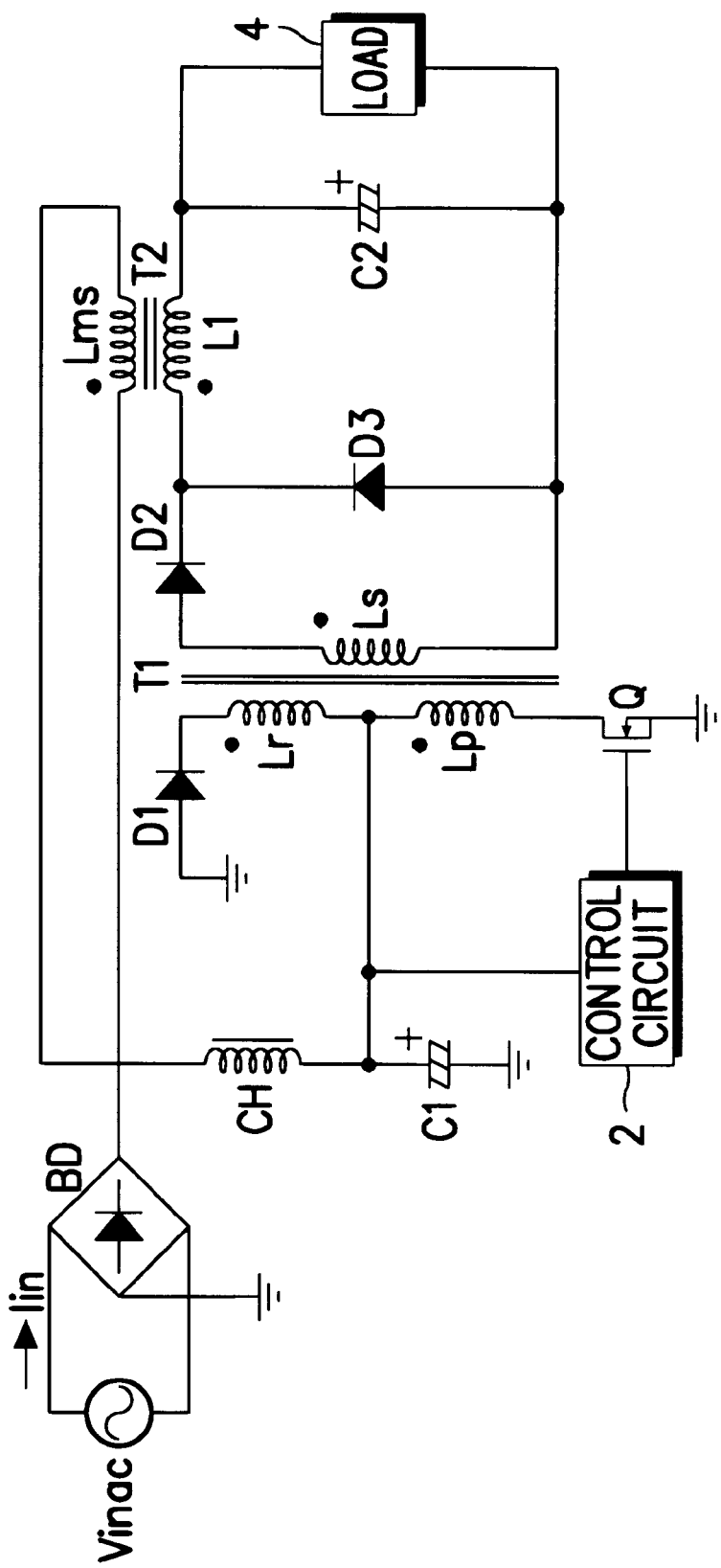
FIG. 4 illustrates the construction of a forward converter according to a preferred embodiment of the present invention.

FIG. 4 illustrates the construction of a forward converter according to a preferred embodiment of the present invention. Like the conventional forward converter, the bridge diode BD, smoothing capacitor C1, control circuit 2, switching element Q, reset diode D1, primary winding Lp of the transformer T1, and reset winding Lr of the transformer T1 are connected to an input side. The secondary winding Ls of the transformer T1, diodes D2 and D3, smoothing capacitor C2 and load 4 are connected to an output side. However, unlike the conventional forward converter, there is provided a transformer T2 including a primary winding L1 connected between the rectifying diodes D2 and D3 and the smoothing capacitor C2, and including a secondary winding Lms connected between the bridge diode BD and the smoothing capacitor C1. There is also provided a choke coil CH connected between the secondary winding Lms of the transformer T2 and the smoothing capacitor C1. The transformer T2 causes the current flowing into the smoothing capacitor C1, that is, the current flowing into the choke coil CH to have the sine waveform as shown in FIG. 3D. The choke coil CH eliminates a harmonic signal component contained in the current flowing into the smoothing capacitor C1.

FIGS. 5A to 5L are operational waveform diagrams of the forward converter of FIG. 4. FIG. 5A indicates an AC input voltage Vinac, FIG. 5B an AC input current Iin, FIG. 5C a gate-to-source voltage Vgs of the switching element Q (field effect transistor), FIG. 5D a drain-source voltage Vds of the switching element Q, FIG. 5E a voltage of the reset diode D1, FIG. 5F a current flowing into the drain of the switching element Q, FIG. 5G a current flowing into the diode D1, FIG. 5H a voltage of the choke coil CH, FIG. 5I a current flowing into the choke coil CH, FIG. 5J a voltage of the secondary winding Ls of the transformer T1, FIG. 5K a voltage of the primary winding L1 of the transformer T2, and FIG. 5L a current flowing into the primary winding L1 of the transformer T2.

Referring back to FIG. 4, if the AC input voltage Vinac is applied, the voltage full-wave rectified by the bridge diode BD is smoothed by the smoothing capacitor C1 via the secondary winding Lms of the transformer T2 and the choke coil CH, and supplied to the primary winding Lp of the transformer T1 and the control circuit 2. The control circuit 2 starts to oscillate as the voltage passing through the choke coil CH is supplied and generates a switching control (on/off) signal. The switching element Q is repeatedly switched on or off according to the switching control signal generated from the control circuit 2.

The operation of the forward converter of FIG. 4 when the switching element Q is switched on will now be described. If the switching-on signal of a logic "HIGH" level generated from the control circuit 2 is applied to the gate of the switching element Q, the switching element Q is switched on. If the switching element Q is switched on, energy accumulated in the primary winding Lp of the transformer T1 is transmitted to the secondary winding Ls of the transformer T1. In this case, a reverse voltage is applied to the choke coil CH through the secondary winding Lms of the transformer T2. Therefore, the current flowing into the choke coil CH, that is, the current flowing into the smoothing capacitor C1 decreases.

Referring to FIGS. 5A to 5L, a forward voltage is applied to the primary winding L1 of the transformer T2 at an interval T1 during which the switching element Q is switched on, as shown in FIG. 5K. Since the reverse voltage is then applied to the secondary winding Lms of the transformer T2, the reverse voltage is applied to the choke coil CH as indicated in FIG. 5H. The current flowing into the choke coil CH decreases as shown in FIG. 5I.

The operation of the forward converter of FIG. 4 when the switching element Q is switched off will now be described. If the switching-off signal of a logic "LOW" level generated from the control circuit 2 is applied to the gate of the switching element Q (field effect transistor), the switching element Q is switched off. If the switching element Q is switched off, energy transmitted to the secondary winding Ls of the transformer T1 decreases. In this case, the forward voltage is applied to the choke coil CH through the secondary winding Lms of the transformer T2. Therefore, the current flowing into the choke coil CH, that is, the current flowing into the smoothing capacitor C1, increases.

Referring to FIGS. 5A to 5L, there is no voltage applied to the primary winding L1 of the transformer T2 at an interval T2 during which the switching element Q is switched off, as shown in FIG. 5K. Since the forward voltage is then applied to the secondary winding Lms of the transformer T2, the forward voltage is applied to the choke coil CH as indicated in FIG. 5H. Hence, the current flowing into the choke coil CH increases as shown in FIG. 5I.

Consequently, when the switching element Q is switched on, the forward converter of FIG. 4 reduces the amount of the input current by supplying the reverse voltage to the capacitor C1 for supplying the smoothed DC voltage to the primary winding Lp of the transformer T1. When the switching element Q is switched off, the forward converter of FIG. 4 increases the amount of the input current by supplying the forward voltage to the capacitor C1 for supplying the smoothed DC voltage to the primary winding Lp of the transformer T1. Therefore, the current flowing into the capacitor C1 has the sine waveform shown in FIG. 5I. This indicates that the amount of an active power increases and that the harmonic noise component is eliminated. Further, a power factor of approximately 0.6 in a typical SMPS is improved to approximately 0.8 in this embodiment of the present invention.

Figure 6:
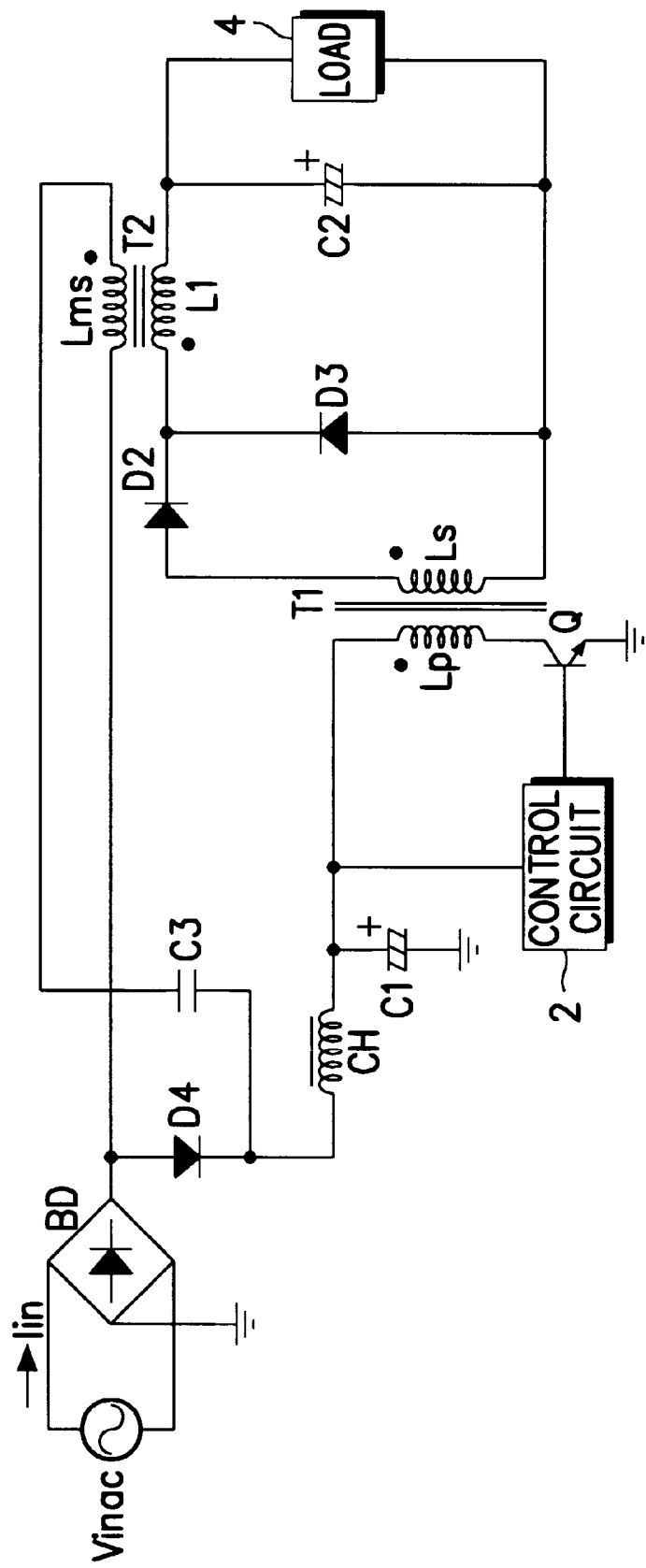
FIG. 6 illustrates the construction of a forward converter according to another preferred embodiment of the present invention.

FIG. 6 illustrates the construction of a forward converter according to another preferred embodiment of the present invention. Referring to FIG. 6, like the conventional forward converter, the bridge diode BD, smoothing capacitor C1, control circuit 2, switching element Q, and primary winding Lp of the transformer T1 are connected to an input side. The secondary winding Ls of the transformer T1, diodes D2 and D3, capacitor C2 and load 4 are connected to an output side. However, the reset diode D1 and the reset winding Lr of the transformer T1 for preventing the switching element Q from being damaged when the switching element Q is switched off are not provided.

On the other hand, unlike the conventional forward converter, there are provided a choke coil CH and a diode D4 which is connected between the bridge diode BD and the smoothing capacitor C1. There is also provided a transformer T2 including a primary winding L1 connected between both of the diodes D2 and D3 and the smoothing capacitor C2, and including a secondary winding Lms connected in parallel to the diode D4 together with the capacitor C3. The diode D4 and the capacitor C3 which are used instead of the diode D1 and the reset winding Lr of the transformer T1 of the conventional forward converter prevent the switching element Q from being damaged when the switching element Q is switched off. The choke coil CH suppresses a noise component of an input signal and suppresses a variation in an instantaneous current by increasing an impedance of an input line.

If the AC input voltage Vinac is applied to the bridge diode BD, the AC voltage Vinac is full-wave rectified and applied to the secondary winding Lms of the transformer T2 and the diode D4. Thereafter, the voltage is smoothed by the smoothing capacitor C1 via the choke coil CH and applied to the control circuit 2 and the primary winding Lp of the transformer T1. The control circuit 2 generates the switching control signal. The switching element Q is repeatedly switched on or off according to the switching control signal.

The operation of the forward converter of FIG. 6 when the switching element Q is switched on will now be described. If the switching element Q is switched on, the DC voltage accumulated in the primary winding Lp of the transformer T1 is induced to the secondary winding Ls. This induced DC voltage is rectified by the diode D2 and transmitted to the primary winding L1 of the transformer T2. The DC voltage transmitted to the primary winding L1 of the transformer T2 is smoothed by the smoothing capacitor C2 and supplied to the load 4 and the secondary winding Lms of the transformer T2. In this case, the voltage transmitted to the secondary winding Lms of the transformer T2 is determined by a voltage determined by a turn ratio of the primary winding L1 and the secondary winding Lms of the transformer T2 and a voltage rectified through the diode D2. The voltage transmitted to the secondary winding Lms of the transformer T2 is applied to the choke coil CH via the capacitor C3. A voltage determined by the voltage of the capacitor C3 and the voltage of the smoothing capacitor C1 among the sum voltage of the voltage passing through the diode D2 and the voltage transmitted to the secondary winding Lms of the transformer T2 passing through the capacitor C3 is applied to the choke coil CH. Therefore, the current flowing into the choke coil CH increases. The capacitor C3 is charged by the current flowing into the choke coil CH. The voltage applied to the choke coil CH is reduced by a slop (the current flowing into the choke coil CH/a capacitance of the capacitor C3).

The operation of the forward converter of FIG. 6 when the switching element Q is switched off will now be described. If the switching element Q is switched off, a serial resonant circuit consisting of the capacitor C3 and an exiting inductance of the secondary winding Lms of the transformer T2 starts to resonate. Then the diode D4 is turned on. Therefore, the current flows into the choke coil CH via the diode D4. A positive (+) voltage appears at the capacitor C3 connected to the secondary winding Lms of the transformer T2, and a forward voltage appears at the secondary winding Lms of the transformer T2. The secondary winding Lms of the transformer T2 induces power to the primary winding L1 and causes the DC voltage to be supplied to the load 4. While this DC voltage is applied, if the voltage of the capacitor C3 becomes 0 volts, no voltage is supplied to the load 4 via the secondary winding Lms of the transformer T2. The resonant current caused by the secondary winding Lms of the transformer T2 and the capacitor C3 gradually decreases and a reverse current starts to flow. The reverse resonant current offsets the current flowing into the choke coil CH and increases until the current flowing into the bridge diode BD becomes 0. If the current flowing into the bridge diode BD becomes 0, the current flowing into the choke coil CH flows through the secondary winding Lms of the transformer T2 and the capacitor C3 and the voltage is not accumulated in the secondary winding Lms of the transformer T2. The supply of the voltage to the load 4 is performed through the flywheel diode D3. Since there is no voltage in the secondary winding Lms of the transformer T2, the voltage supplied to the choke coil CH increases and the capacitor C3 is charged by the current flowing into the choke coil CH.

FIGS. 7A to 7L show operational waveforms of the forward converter of FIG. 6. A reference symbol T1 indicates an interval during which the switching element Q is switched on, and T2 designates an interval during which the switching element Q is switched off. FIG. 7A indicates the AC input voltage Vinac, FIG. 7B an AC input current Iin, FIG. 7C a base-to-emitter voltage Vbe of the switching element Q (transistor), FIG. 7D a collector-emitter voltage Vce of the switching element Q, FIG. 7E a current flowing into the collector of the switching element Q, FIG. 7F a voltage of the diode D4, FIG. 7G a current flowing into the diode D4, FIG. 7H a voltage of the capacitor C3, FIG. 7I a current flowing into the capacitor C3, FIG. 7J a voltage of the secondary winding Lms of the transformer T2, FIG. 7K a current flowing into the choke coil CH, and FIG. 7L an output current flowing into the load 4.

Referring to FIGS. 7A to 7L, during the switching-on operation of the forward converter of FIG. 6, since the switching control signal of a logic "HIGH" level is applied to the base of the switching element Q, the switching element Q is switched on. Then the DC voltage accumulated in the primary winding Lp of the transformer T1 is induced to the secondary winding Ls and this induced voltage is rectified by the diode D2. The rectified DC voltage is smoothed by the capacitor C2 and supplied to the load 4. At the same time, since the rectified DC voltage is transmitted to the secondary winding Lms of the transformer T2, the current flowing into the choke coil CH increases as shown in FIG. 7K.

During the switching-off operation of the forward converter of FIG. 6, since the switching control signal of a logic "LOW" level is applied to the base of the switching element Q, the switching element Q is switched off. The secondary winding Lms of the transformer T2 and the capacitor C3 start to resonate. Then the resonant circuit consisting of the secondary winding Lms of the transformer T2 and the capacitor C3 supplies a reverse current to the choke coil CH as shown in FIG. 7I. This reverse current increases until the current flowing into the choke coil CH becomes 0.

Consequently, the forward converter of FIG. 6 has the diode D4 connected between the bridge diode BD and the smoothing capacitor C1. The diode D4 is connected in parallel to the secondary winding Lms of the transformer T2 and the capacitor C3 which are serially connected to each other. The secondary winding Lms of the transformer T2 is installed correspondingly to the primary winding L1 connected between the rectifying diodes D2 and D3 and the smoothing capacitor C2. The windings L1 and Lms constitute the primary winding and the secondary winding of the transformer T2, respectively. Moreover, the choke coil CH is connected between a reverse terminal of the diode D4 and the smoothing capacitor C1.

During the switching-on operation of the forward converter, the voltage is transmitted to the secondary winding Lms of the transformer T2 and the capacitor C3 and thus the current flowing into the smoothing capacitor C1, that is, the current flowing into the choke coil CH increases. During the switching-off operation of the forward converter, the resonant circuit consisting of the secondary winding Lms of the transformer T2 and the capacitor C3 starts to resonate and the current flowing into the choke coil CH flows into the diode D4. The resonant circuit generates the reverse resonant current to offset the current flowing into the choke coil CH and increases the resonant current until the current flowing into the choke coil CH becomes 0.

As noted above, the inventive forward converter causes the input current flowing into the smoothing capacitor to approximate to the sine waveform. Therefore, the power factor is improved by reducing the inactive power of the SMPS and a harmonic noise component is suppressed. As a result, malfunctions in the SMPS are prevented.

While there have been shown and described what are considered to be preferred embodiments of the present invention, it will be apparent to those skilled in the art that various changes and modifications may be made therein without departing from the spirit of the invention as defined in the appended claims.

What is claimed is:

1. A forward converter comprising:
   a bridge diode for full-wave rectifying an AC input voltage to generate a first DC voltage;
   a first smoothing capacitor for smoothing said first DC voltage to generate a second DC voltage;
   a control circuit for generating a switching control signal having a prescribed period in response to an input of said second DC voltage;
   a switching element connected between said first smoothing capacitor and a ground terminal, and switched on or off in response to said switching control signal;
   a transformer, having a primary winding and a secondary winding, for receiving said second DC voltage through said primary winding when said switching element is switched on and for inducing said second DC voltage to said secondary winding;
   a waveform shaper, connected between said bridge diode and said first smoothing capacitor, for causing a current flowing into said first smoothing capacitor to have a sine waveform;
   a rectifying element, connected between said secondary winding of said transformer and a load, for rectifying a DC voltage induced to said secondary winding to generate a third DC voltage; and
   a second smoothing capacitor for smoothing said third DC voltage to supply a stable DC voltage to said load.

2. The forward converter according to claim 1, wherein said waveform shaper is a transformer having a primary winding connected between said rectifying element and said load and having a secondary winding connected between said bridge diode and said first smoothing capacitor.

3. The forward converter according to claim 1, further comprising:
   a choke coil, connected between said waveform shaper and said first smoothing capacitor, for eliminating a harmonic component of a current flowing into said first smoothing capacitor.

4. A forward converter comprising:
   a bridge diode for full-wave rectifying an AC input voltage to generate a first DC voltage;
   a first smoothing capacitor for smoothing said first DC voltage to generate a second DC voltage;
   a control circuit for generating a switching control signal having a prescribed period in response to an input of said second DC voltage;
   a switching element connected between said first smoothing capacitor and a ground terminal, and switched on or off in response to said switching control signal;

a transformer, having a primary winding and a secondary winding, for receiving said second DC voltage through said primary winding when said switching element is switched on and for inducing said second DC voltage to said secondary winding;

a voltage provider, connected between said bridge diode and said first smoothing capacitor, for providing a reverse voltage to said primary winding of said transformer when said switching element is switched on, and for providing a forward voltage to said primary winding of said transformer when said switching element is switched off;

a rectifying element, connected between said secondary winding of said transformer and a load, for rectifying a DC voltage induced to said secondary winding to generate a third DC voltage; and a second smoothing capacitor for smoothing said third DC voltage to supply a stable DC voltage to said load.

5. The forward converter according to claim 4, wherein said voltage provider is a transformer having a primary winding connected between said rectifying element and said second smoothing capacitor and having a secondary winding connected between said bridge diode and said first smoothing capacitor.

6. The forward converter according to claim 4, further comprising:

a choke coil, connected between said voltage provider and said first smoothing capacitor, for eliminating a harmonic component of a current flowing into said first smoothing capacitor.

7. A forward converter including:

a bridge diode for full-wave rectifying an AC input voltage to generate a first DC voltage;

a first smoothing capacitor for smoothing said first DC voltage to generate a second DC voltage;

a control circuit for generating a switching control signal having a prescribed period in response to an input of said second DC voltage;

a switching element connected between said first smoothing capacitor and a ground terminal, and switched on or off in response to said switching control signal;

a first diode connected between said ground terminal and said first smoothing capacitor;

a main transformer, having a primary winding connected between said first smoothing capacitor and said switching element, having a reset winding connected between said first smoothing capacitor and said first diode and having a secondary winding connected to a load, for accumulating said second DC voltage in said primary winding so as to be induced to said secondary winding when said switching element is switched on, and transmitting energy accumulated in said primary winding to said ground terminal through said reset winding and said first diode when said switching element is switched off;

a first rectifying element, connected between one side of said secondary winding of said main transformer and said load, for rectifying a voltage induced to said secondary winding of said main transformer;

a second rectifying element, connected between the other side of said secondary winding of said main transformer and said load, for rectifying a voltage induced to said secondary winding of said main transformer;

a second smoothing capacitor, connected in parallel to said load, for smoothing a voltage generated through one of said first and second rectifying elements to supply a stable DC voltage to said load;

an auxiliary transformer having a primary winding connected between each of said first and second rectifying elements and said second smoothing capacitor, and having a secondary winding connected between said bridge diode and said first smoothing capacitor.

8. The forward converter according to claim 7, further comprising:

a choke coil, connected between said secondary winding of said auxiliary transformer and said first smoothing capacitor, for eliminating a harmonic component of a current flowing into said first smoothing capacitor.

9. A forward converter comprising:

a bridge diode for full-wave rectifying an AC input voltage to generate a first DC voltage;

a first smoothing capacitor for smoothing said first DC voltage to generate a second DC voltage;

a control circuit for generating a switching control signal having a prescribed period in response to an input of said second DC voltage;

a switching element connected between said first smoothing capacitor and a ground terminal, and switched on or off in response to said switching control signal;

a first diode connected between said bridge diode and said first smoothing capacitor;

a choke coil connected between said first diode and said first smoothing capacitor;

a main transformer, having a primary winding connected between said first smoothing capacitor and said switching element and having a secondary winding connected to a load, for accumulating said second DC voltage in said primary winding so as to be induced to said secondary winding when said switching element is switched on;

a rectifying element, connected between said secondary winding of said main transformer and said load, for rectifying a voltage induced to said secondary winding of said main transformer;

a second smoothing capacitor, connected in parallel to said load, for smoothing a voltage generated through said rectifying element to supply a stable DC voltage to said load; and current control means, connected in parallel to said first diode, for increasing a current flowing into said choke coil when said switching element is switched on and providing a reverse current to said choke coil when said switching element is switched off.

10. The forward converter according to claim 9, wherein said current control means comprises:

a resonant circuit having a secondary winding of a transformer installed correspondingly to a primary winding connected between said rectifying element and said secondary smoothing capacitor and having a capacitor, said resonant circuit being connected in parallel to said first diode.

11. A forward converter comprising:

a bridge diode for full-wave rectifying an AC input voltage to generate a first DC voltage;

a first smoothing capacitor for smoothing said first DC voltage to generate a second DC voltage;

a control circuit for generating a switching control signal having a prescribed period in response to an input of said second DC voltage;

a switching element connected between said first smoothing capacitor and a ground terminal and switched on or off in response to said switching control signal;

a first diode connected between said bridge diode and said first smoothing capacitor;

a main transformer, having a primary winding connected between said first smoothing capacitor and said switching element and having a secondary winding connected to a load, for accumulating said second DC voltage in said primary winding so as to be induced to said secondary winding when said switching element is switched on;

a second diode, connected between one side of said secondary winding of said main transformer and said load, for rectifying a voltage induced to said secondary winding of said main transformer;

a third diode, connected between the other side of said secondary winding of said main transformer and said load, for rectifying a voltage induced to said secondary winding of said main transformer;

a second smoothing capacitor, connected in parallel to said load, for smoothing a voltage generated through one of said second and third diodes to supply a stable DC voltage to said load;

an auxiliary transformer having a primary winding connected between a reverse terminal of each of said second and third diodes and said second smoothing capacitor and having a secondary winding connected in parallel to said first diode;

a choke coil connected between said first diode and said first smoothing capacitor; and a third capacitor connected between said secondary winding of said auxiliary transformer and said choke coil.

* * * * *